United States Patent
Schoenbauer

(10) Patent No.: US 6,565,001 B1
(45) Date of Patent: May 20, 2003

(54) RECEIVER CIRCUIT AND METHOD FOR A CONTACTLESS IDENTIFICATION SYSTEM

(75) Inventor: Steve Schoenbauer, Colorado Springs, CO (US)

(73) Assignee: EM Microelectronics-US, Inc, Colorado Springs, CO (US)

( * ) Notice: Subject to any disclaimer, the term of this patent is extended or adjusted under 35 U.S.C. 154(b) by 0 days.

(21) Appl. No.: 10/008,596

(22) Filed: Nov. 8, 2001

(51) Int. Cl.[7] .................................................. G06K 7/08
(52) U.S. Cl. ........................................ 235/451; 235/492
(58) Field of Search ................................. 235/451, 492

(56) References Cited

U.S. PATENT DOCUMENTS 4,555,792 A * 11/1985 Vantol ......................... 235/492

* cited by examiner

Primary Examiner—Harold I. Pitts
(74) Attorney, Agent, or Firm—Law Office of Dale B. Halling, LLC

(57) ABSTRACT

A receiver circuit (30) for a contactless identification system, includes an antenna (32). The antenna (32) receives an amplitude modulated signal. A voltage envelope detector (34) is connected to the antenna (32). A current envelope detector (36) is connected to the antenna (32). A first comparator (38) has a first input (40) connected to an output of the voltage envelope detector (34) and a second input (42) connected to a threshold. A second comparator (44) has a first input (46) connected to an output of the current envelope detector (36) and a second input (48) connected to the threshold. A logic gate (50) combines an output (52) of the first comparator (38) and an output (54) of the second comparator (44).

21 Claims, 5 Drawing Sheets

RECEIVER CIRCUIT AND METHOD FOR A CONTACTLESS IDENTIFICATION SYSTEM

FIELD OF THE INVENTION

The present invention relates generally to the field of contactless systems and more particularly to a receiver circuit and method for a contactless identification system.

BACKGROUND OF THE INVENTION

Contactless identification systems and smart cards do not have internal power sources. As a result they require a receiver circuit that captures both power and information. Commonly, these systems amplitude modulate (AM) the carrier wave to transmit information. Unfortunately, the present receivers have problems receiving information over a range distances between the card and the reader.

Thus there exists a need for a receiver circuit that increases the capability of the card to "see" the reader over a wide range of distances.

DETAILED DESCRIPTION OF THE DRAWINGS

A receiver circuit for a contactless identification system includes an antenna. The antenna receives an amplitude modulated signal. A voltage envelope detector is connected to the antenna. A current envelope detector is connected to the antenna. A first comparator has a first input connected to an output of the voltage envelope detector and a second input connected to a threshold. A second comparator has a first input connected to an output of the current envelope detector and a second input connected to the threshold. A logic gate combines an output of the first comparator and an output of the second comparator. This circuit measures both the voltage induced by the input signal and the current induced by the input signal. Prior art systems only measure the induced voltage. As a result the present circuit has a wider dynamic range which allows a contactless card to work over a wider range of distances from the reader.

Figure 1:
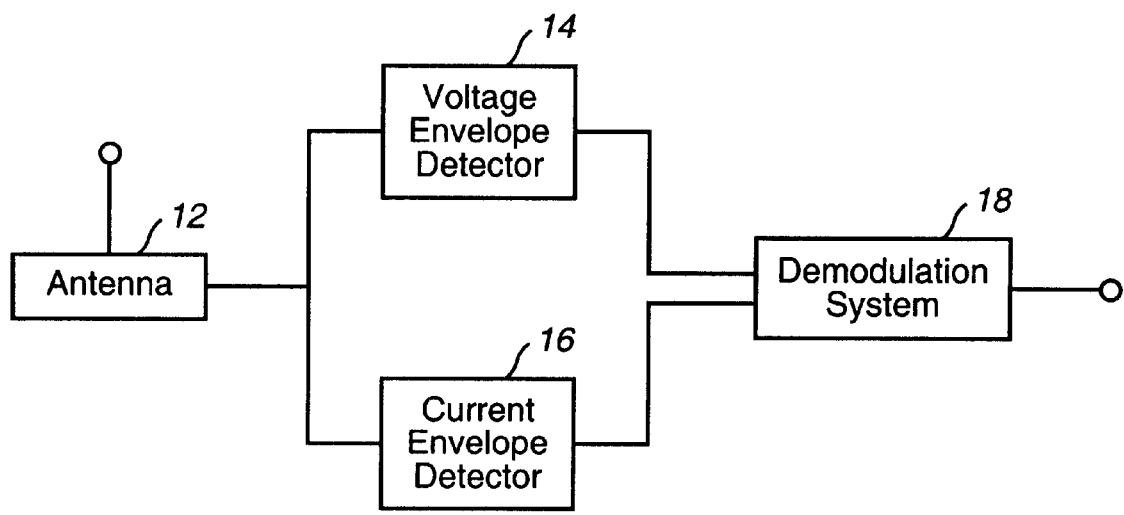
FIG. 1 is a block diagram of a receiver circuit for a contactless identification system in accordance with one embodiment of the invention.

FIG. 1 is a block diagram of a receiver circuit 10 for a contactless identification system in accordance with one embodiment of the invention. The system 10 includes an antenna 12. A voltage envelope detector 14 is connected to the antenna 12. A current envelope detector 16 is connected to the antenna 12. A demodulation system 18 is connected to the output of the voltage envelope detector 14 and the output of the current envelope detector 16. The output of the demodulation system is the detected signal. In one embodiment, the current envelope detector 16 includes a shunt regulator connected to the antenna 12. The shunt regulator has two functions. One function is to limit the voltage seen by the voltage envelope detector 14. The second function is to convert a bleed current into a voltage. The current envelope detector includes an envelope follower connected to the shunt regulator.

In one embodiment, the demodulation system includes a first comparator having a first input connected to an output of the voltage envelope detector. A second input of the first comparator is connected to a first threshold. A second comparator has a first input connected to an output of the current envelope detector and a second input connected to a second threshold. The comparators are used to shape the signals into square-waves. A logic gate has a first input connected to an output of the first comparator and a second input connected to an output of the second comparator. The output of the logic gate is the demodulated signal.

Figure 2:
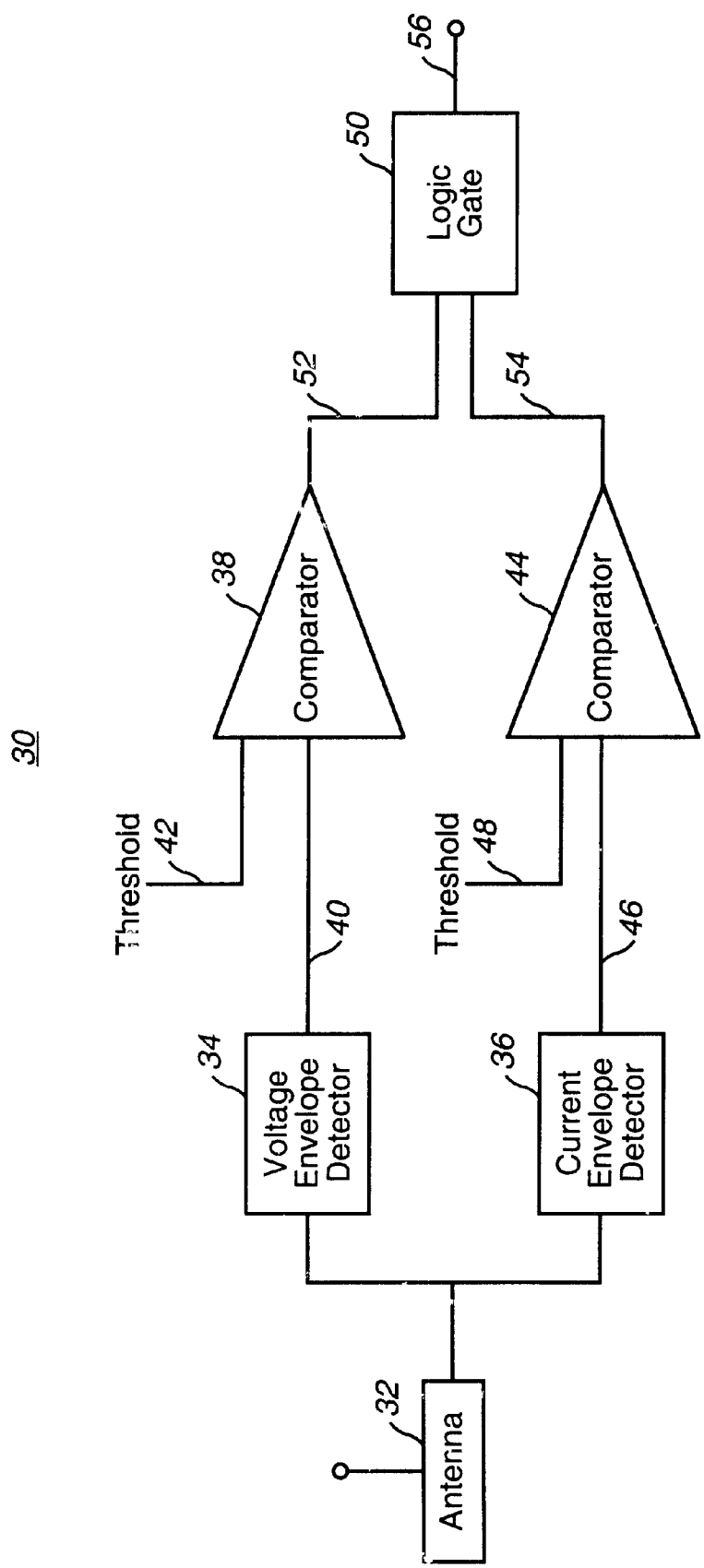
FIG. 2 is a block diagram of a receiver circuit for a contactless identification system in accordance with one embodiment of the invention.

FIG. 2 is a block diagram of a receiver circuit 30 for a contactless identification system in accordance with one embodiment of the invention. An antenna 32 receives an amplitude modulated signal. A voltage envelope detector 34 and a current envelope detector 36 are connected to the antenna 32. A first comparator 38 has a first input 40 connected to an output of the voltage envelope detector 34. A second input 42 of the comparator 38 is connected to a threshold. A second comparator 44 has first input 46 connected to the output the current envelope detector 36 and a second input 48 connected to the threshold. A logic gate 50 combines the output 52 the first comparator 38 and the output 54 of the second comparator 44 to form an output signal 56. In one embodiment the current envelope detector 36 includes a shunt regulator connected to the antenna 32. A shunt voltage of the shunt regulator is connected to an evelope follower. The shunt regulator includes a bleed transistor that bleeds off current when the voltage at the voltage envelope detector is above a threshold. The shunt regulator includes a control path in parallel with the bleed transistor. The control path has a transistor connected to the antenna. A first resistor is connected to the transistor and a second resistor is connected between the first resistor and an electrical ground. The shunt voltage is measured at a node between the transistor and the first resistor. A gate of the bleed transistor is connected to a node between the first resistor and the second resistor.

The shunt regulator also includes a trigger path in parallel with the control path. The trigger path includes a mirror diode connected to the antenna and the transistor of the control path. A second diode is connected to the mirror diode and a third diode connected between the second diode and the ground.

In one embodiment, the logic gate is an AND gate. In another embodiment, a biaser system is connected to the first comparator and the second comparator.

Figure 3:
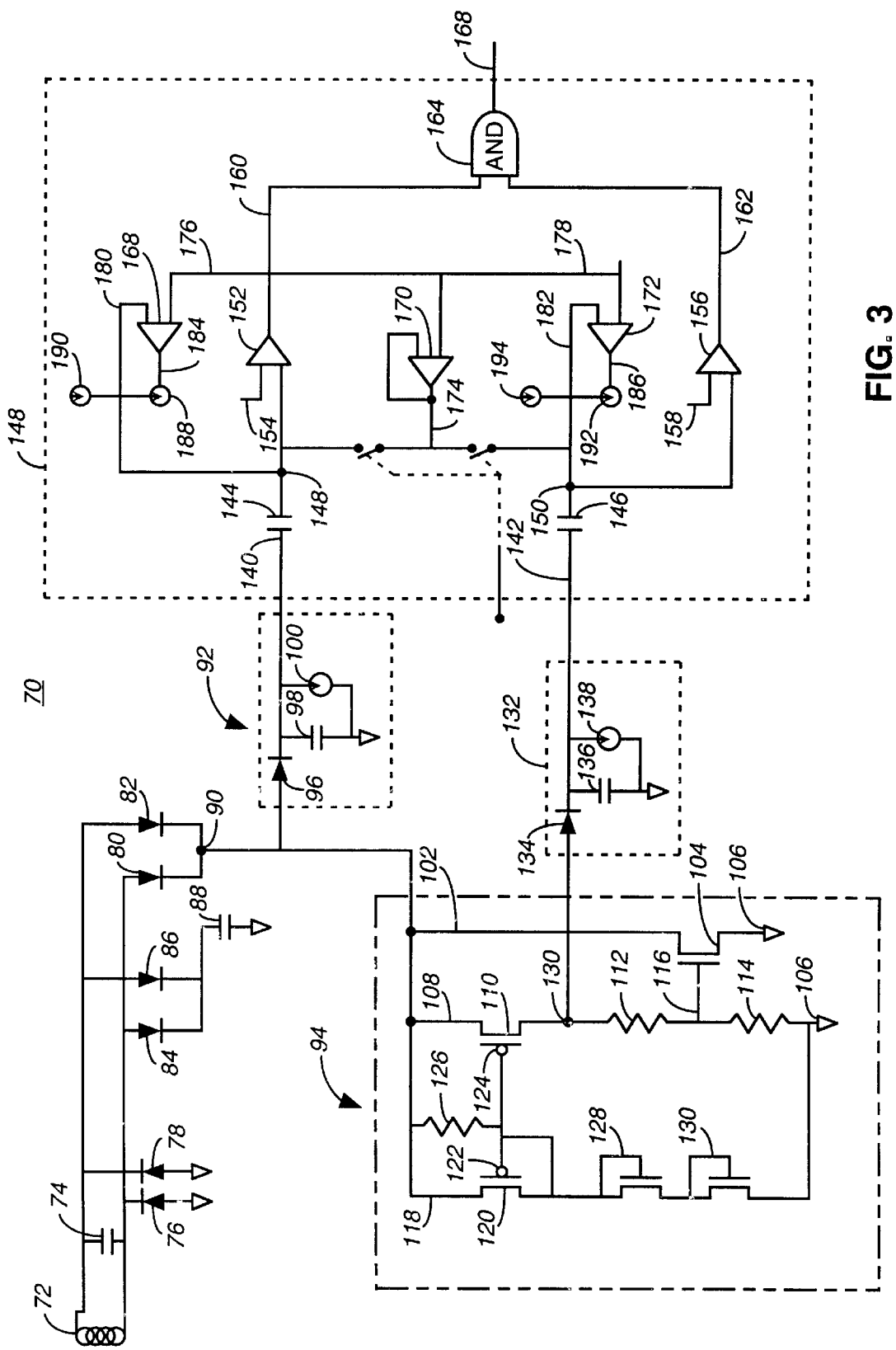
FIG. 3 is a schematic diagram of a receiver circuit for a contactless identification system in accordance with one embodiment of the invention.
Figure 4A:
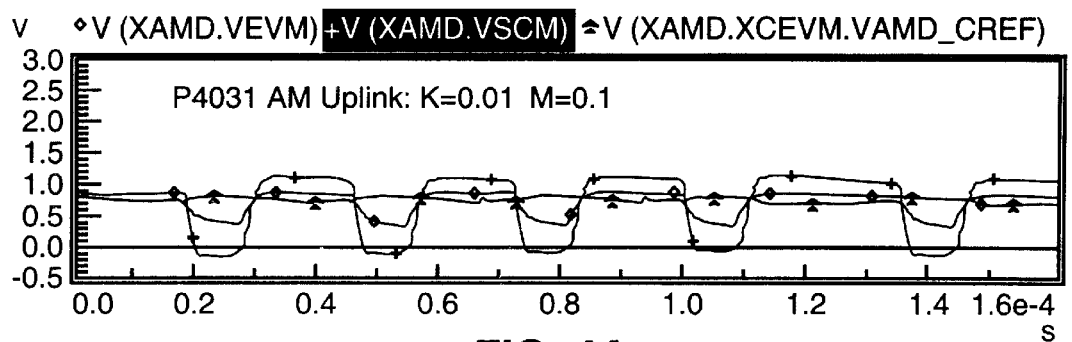
FIGS. 4A–D are plots of the signals at various points of the receiver circuit of FIG. 3.
Figure 4B:
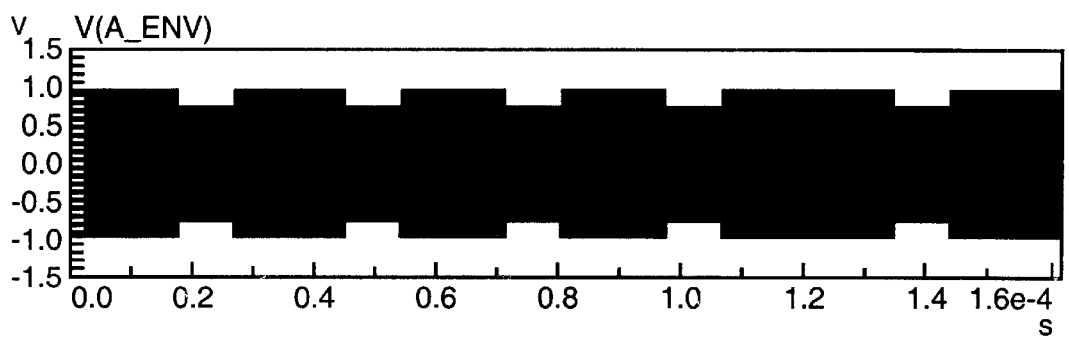

FIG. 3 is a schematic diagram of a receiver circuit 70 for a contactless identification system in accordance with one embodiment of the invention. A wire coil 72 acts as an antenna for the receiver circuit 70. An example of the signal seen by the wire coil 72 is shown in FIG. 4B. Note that the received signal is an amplitude modulated signal. A capacitor 74 is in parallel with the coil 72. Diodes 76, 78, 80, 82 in combination with the capacitor 74 form a full wave, rectifier. Diodes 84, 86 and capacitor 88 form a rectifier to provide power for the contactless ID card. The output 90 of the full wave rectifier is connected to a voltage envelope follower 92 and a shunt regulator 94. The shunt regulator 94 limits the voltage seen by the voltage envelope detector 92.

This protects the envelope follower 92 from voltage spikes and excessive voltages. The voltage envelope follower 92 has a diode 96 connected to the output 90 of the full wave rectifier. A capacitor 98 is connected to the output of the diode 96. A current source 100 (e.g., a transistor) is connected in parallel with the capacitor 98.

The shunt regulator 94 has three parallel paths. A first path 102 has a bleed transistor 104 connected to ground 106. The bleed transistor 104 turns on when the voltage exceeds a limit at the output 90. Thus the bleed transistor limits the upper voltage seen by the voltage envelope follower 92. A control path 108 has a mirror transistor 110, a first resistor 112, and a second resistor 114 connected to ground 106. A gate 116 of the bleed transistor 104 is connected to a node between the first resistor 112 and the second resistor 114.

A trigger path 118 has a mirror diode 120 in parallel with the transistor 110. The gates 122, 124 are electrically tied together. A resistor 126 is connected between the gates 122, 124 and the output 90. The mirror transistor 110 turns on when the diode 120 draws current. A second diode 128 in the trigger path 118 is connected to the mirror diode 120. A third diode 130 connected between the second diode 128 and ground 106. Note that all the diodes are shown as diode connected transistors.

When the voltage at the output 90 is sufficient to cause current to flow through the trigger path 118, it turns on the mirror transistor 110. When the current through the control path 108 is sufficient, it turns on the bleed transistor 104. Note that the shunt regulator 94 converts the current through the control path 108 into a voltage across resistors 112, 114. The shunt voltage 130 between the mirror diode 110 and the first resistor 112 is proportional to the current flowing through the shunt regulator 94. This shunt voltage 130 is connected to a current envelope follower 132.

The current envelope follower 132 forms an envelope of the voltage 130 which is proportional to a current across the shunt regulator 94. The current envelope follower 132 has a diode connected to the shunt voltage 130. A capacitor 136 is connected to the output of the diode 134. A current source 138 (e.g., a transistor) is connected in parallel with the capacitor 136.

Figure 4C:
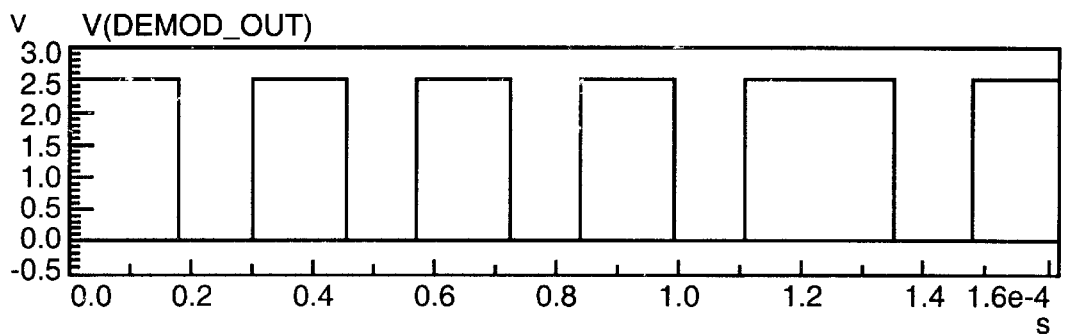
Figure 4D:
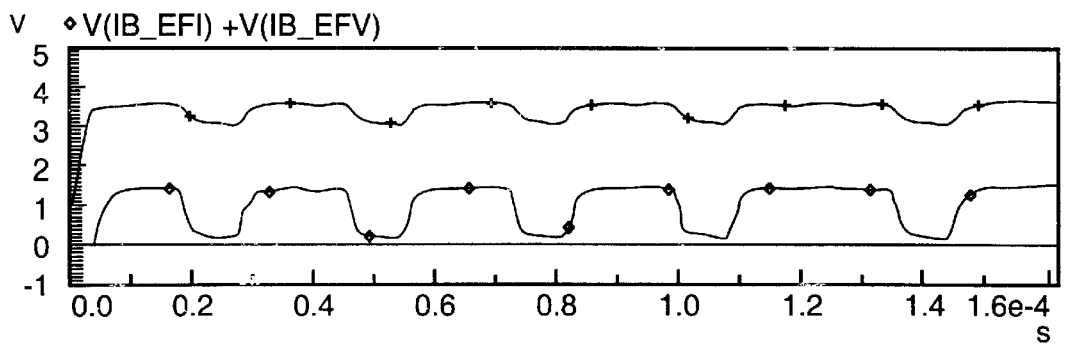

FIG. 4D shows the outputs 140, 142 of the voltage envelope follower 92 and the current envelope follower 132. A pair of capacitors 144, 146 "ac" couple the outputs 140, 142 to the demodulation system 148. Examples of the "ac" coupled outputs 148, 150 are shown in FIG. 4A. The "ac" coupled output 148 of the voltage envelope follower 92 is connected to a first comparator 152. The second input 154 of the comparator 152 is connected to a threshold voltage. The "ac" coupled output 150 of the current envelope follower 132 is connected to a second comparator 156. The second input 158 of the comparator 156 is connected to a threshold voltage. The outputs 160, 162 are connected to an AND gate 164. The output 166 of the AND gate is the demodulated signal and an example of the output 166 is shown in FIG. 4C.

A biaser system is used to adjust the voltage level of the outputs 148, 150. The biaser system has three operation amplifiers 168, 170, 172. The output 174 of operational amplifier 170 is connected to the "ac" coupled outputs 148, 150. The operational amplifiers 168, 172 have one input 176, 178 connected to an input of the operational amplifier 170. The second input 180, 182 of the operational amplifiers 168, 172 is connected to the "ac" coupled outputs 148, 150. The outputs 184, 186 are connected to a pair of current sources 188, 190, 192, 194 in series.

While the circuit shows a specific implementation of the invention, the invention and appended claims are not limited to this implementation. For instance, more or fewer diodes 120, 128, 130 could be used in the control path. Other electronic devices could be used to perform the same function (e.g., Zener diodes) as will be apparent to those skilled in the art. Numerous other examples could be pointed out, but they would be only redundant to those skilled in the art.

Figure 5:
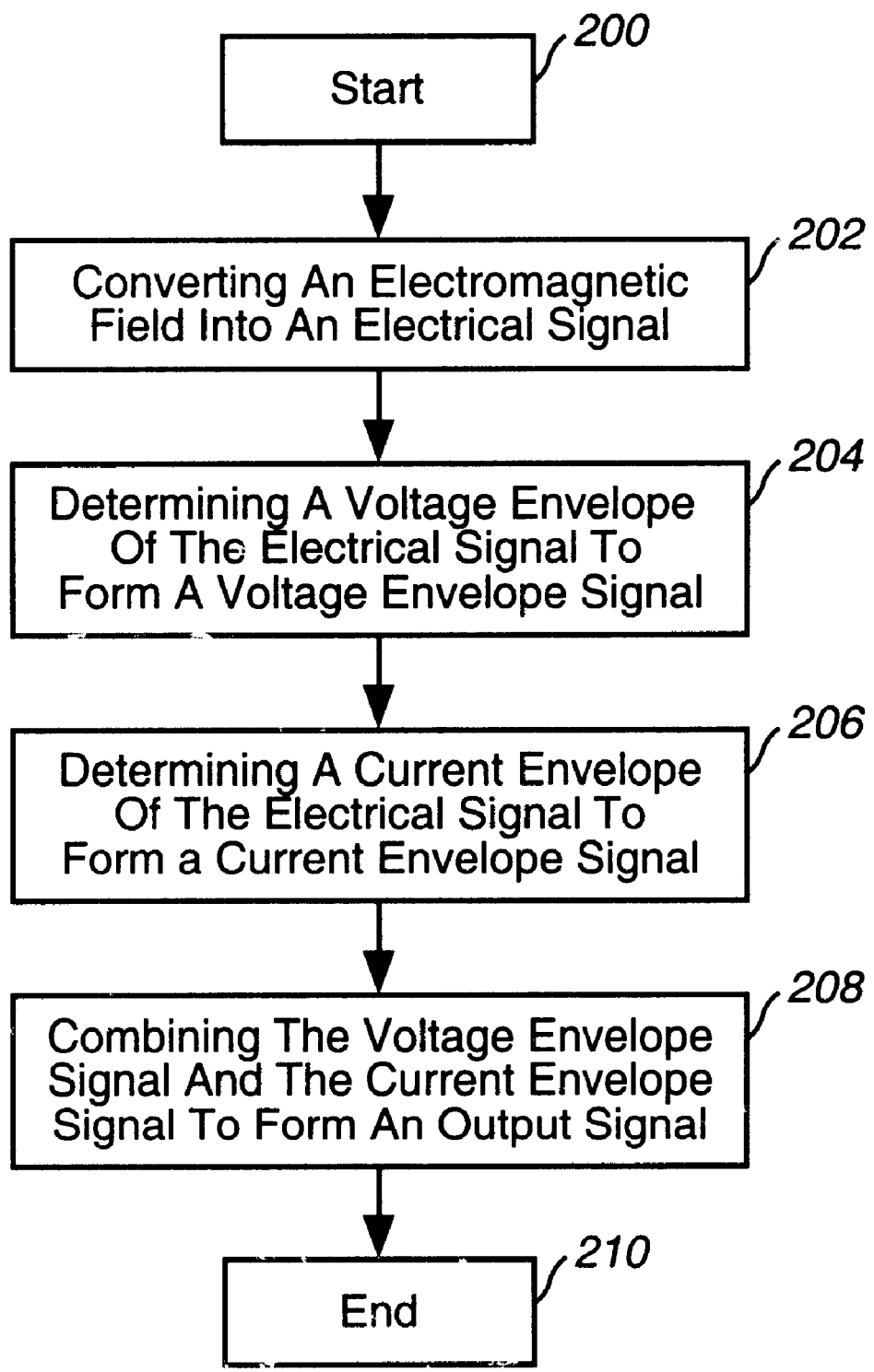
FIG. 5 is a flow chart of the steps used in a method of operating a receiver circuit for a contactless identification system in accordance with one embodiment of the invention.

FIG. 5 is a flow chart of the steps used in a method of operating a receiver circuit for a contactless identification system in accordance with one embodiment of the invention. The process starts, step 200, by converting an electromagnetic field Into an electrical signal at step 202. A voltage envelope of the electrical signal is determined to form a voltage envelope signal at step 204. A current envelope of the electrical signal is determined to form a current envelope signal at step 206. At step 208, the voltage envelope signal and the current envelope signal are combined to form an output signal which ends the process at step 210. In one embodiment, the electrical signal is rectified before the envelopes are determined. In another embodiment the voltage of the electrical signal is limited by a shunt regulator. The voltage of the shunt regulator is used to form a current signal (i.e., the voltage is proportional to the current across the shunt regulator).

In one embodiment the voltage envelope signal is compared to a first threshold to form a clean voltage signal. The current envelope signal is compared to a second threshold to form a clean current signal. The clean voltage signal and the clean current signal are logically combined to form the desired output.

Thus there has been described a method and receiver circuit for a contactless ID system that detects both the current and voltage received by an antenna. As a result the receiver circuit works over a wider range of distance between the circuit and a reader.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A receiver circuit for a contactless identification system, comprising:
    an antenna receiving an amplitude modulated signal;
    a voltage envelope detector connected to the antenna;
    a current envelope detector connected to the antenna;
    a first comparator having a first input connected to an output of the voltage envelope detector and a second input connected to a threshold;
    a second comparator having a first input connected to an output of the current envelope detector and a second input connected to the threshold; and
    a logic gate combining an output of the first comparator and an output of the second comparator.

2. The circuit of claim 1, wherein the current envelope detector includes a shunt regulator connected to the antenna.

3. The circuit of claim 2, wherein a shunt voltage of the shunt regulator is connected to a voltage envelope follower.

4. The circuit of claim 3, wherein the shunt regulator includes a bleed transistor connected to the antenna.

5. The circuit of claim 4, wherein the shunt regulator includes a control path in parallel with the bleed transistor, the control path having a transistor connected to the antenna, a first resistor connected to the transistor and a second resistor connected between the first resistor and a ground.

6. The circuit of claim 5, wherein the shunt voltage is measured at a node between the transistor and the first resistor.

7. The circuit of claim 6, wherein a gate of the bleed transistor is connected to a node between the first resistor and the second resistor.

8. The circuit of claim 7, wherein the shunt regulator includes a trigger path in parallel with the control path, the trigger path including a mirror diode connected to the antenna and the transistor of the control path, a second diode connected to the mirror diode and a third diode connected between the second diode and the ground.

9. The circuit of claim 1, wherein the logic gate is an AND gate.

10. The circuit of claim 1, further including a biaser system connected to the first comparator and the second comparator.

11. A method of operating a receiver for a contactless identification system, comprising the steps of:

(a) converting an electromagnetic field into an electrical signal;

(b) determining a voltage envelope of the electrical signal to form a voltage envelope signal;

(c) determining a current envelope of the electrical signal to form a current envelope signal; and (d) combining the voltage envelope signal and the current envelope signal to form an output signal.

12. The method of claim 11, wherein step (a) further includes the step of:

(a1) rectifying the electrical signal.

13. The method of claim 11, wherein step (b) further includes the step of:

(b1) limiting a voltage of the electrical signal by a shunt regulator.

14. The method of claim 13, wherein step (c) further includes the step of:

(c1) detecting a voltage of the shunt regulator to form a current signal.

15. The method of claim 11, wherein step (d) further includes the steps of:

(d1) comparing the voltage envelope signal to a first threshold to form a clean voltage signal;

(d2) comparing the current envelope signal to a second threshold to form a clean current signal.

16. The method of claim 15, further including the steps of:

(d3) logically combining the clean voltage signal and the clean current signal.

17. A receiver circuit for a contactless identification system, comprising:

an antenna;

a voltage envelope detector connected to the antenna;

a current envelope detector connected to the antenna; and a demodulation system connected to an output of the voltage envelope detector and the current envelope detector.

18. The receiver circuit of claim 17, wherein the current envelope detector includes a shunt regulator connected to the antenna.

19. The receiver circuit of claim 18, wherein the current envelope detector includes an envelope follower connected to the shunt regulator.

20. The receiver circuit of claim 17, wherein the demodulation system includes:

a first comparator having a first input connected to an output of the voltage envelope detector and a second input connected to a first threshold;

a second comparator having a first input connected to an output of the current envelope detector and a second input connected to a second threshold.

21. The receiver circuit of claim 20, further including a logic gate having a first input connected to an output of the first comparator and a second input connected to an output of the second comparator.

* * * * *